United States Patent [19]

Felde et al.

[11] Patent Number: 5,581,073

[45] Date of Patent: Dec. 3, 1996

[54] MACHINE AND HUMAN READABLE LABEL

[75] Inventors: Steven L. Felde; Kenneth R. Shelley, both of Tucson, Ariz.

[73] Assignee: International Business Machines Corporation, Armonk, N.Y.

[21] Appl. No.: 503,839

[22] Filed: Jul. 18, 1995

Related U.S. Application Data

[62] Division of Ser. No. 228,533, Apr. 15, 1994, Pat. No. 5,484,055.

[51] Int. Cl.⁶ .......................... G06K 21/00; G11B 23/02
[52] U.S. Cl. .......................... 235/489; 360/132
[58] Field of Search .......................... 235/445, 446, 235/442, 472, 489, 458; 360/132, 133

[56] References Cited

U.S. PATENT DOCUMENTS

| | | | |
|---|---|---|---|
| 2,980,319 | 4/1961 | Clements et al. | 235/472 X |
| 3,621,265 | 11/1971 | Berler | 235/472 X |
| 3,644,715 | 2/1972 | Holderith | 235/442 X |
| 3,736,410 | 5/1973 | Ragland et al. | 235/472 X |
| 4,602,151 | 7/1986 | Hellsberg | 235/458 X |
| 4,856,820 | 8/1989 | Kasprzak et al. | 283/81 |
| 4,889,982 | 12/1989 | Young et al. | 235/494 |
| 4,935,611 | 6/1990 | Yaniv | 235/487 |
| 5,029,034 | 7/1991 | Weiley | 360/132 |
| 5,032,707 | 7/1991 | Gudmundson et al. | 235/375 |
| 5,083,816 | 1/1992 | Folga et al. | 283/81 |
| 5,199,084 | 3/1993 | Kishi et al. | 382/48 |
| 5,239,437 | 8/1993 | Hoge et al. | 360/132 |
| 5,243,485 | 9/1993 | Weiley | 360/132 |
| 5,253,136 | 10/1993 | Suzuki et al. | 360/132 |
| 5,301,043 | 4/1994 | Ichikawa | 358/498 |

FOREIGN PATENT DOCUMENTS

| | | | |
|---|---|---|---|
| 1806556 | 5/1970 | Denmark | 235/489 |
| 2151133 | 4/1972 | Denmark | 235/489 |

*Primary Examiner*—John Shepperd
*Assistant Examiner*—Thien M. Le
*Attorney, Agent, or Firm*—D. A. Shifrin

[57] ABSTRACT

The present invention provides machine and human readable information for a data cartridge or other item to be stored. In one embodiment, a label, on which human readable information is printed or similarly marked, is applied to cover an indicator area of the cartridge. The indicator area of the cartridge has recesses formed therein; corresponding positions on the indicator area of the label overlay the recesses and be either open or closed. An open position allows a mechanical, spring-loaded finger on a data drive to engage the exposed recess and activate or deactivate a connected switch. Information, matching the printed human readable information, can thus be encoded in the label and machine read by the data drive.

7 Claims, 3 Drawing Sheets

MACHINE AND HUMAN READABLE LABEL

TECHNICAL FIELD OF THE INVENTION

This application is a divisional application under 37 CFR § 1.60 of prior patent application Ser. No. 08/228,533 filed on Apr. 15, 1994, now U.S. Pat. No. 5,484,055.

The present invention relates to labelling stored items, and in particular, to a label, containing both machine and human readable information, applied to an item.

BACKGROUND OF THE INVENTION

In an automated information storage and retrieval library system, each piece of media (such as magnetic tape or an optical disk) on which data is recorded is generally housed within a rigid cartridge body for protection and ease of handling. Because the cartridge is handled by humans (loading and removing the cartridge into and from the library), a mechanical accessor (internally transporting the cartridge between a storage cell and a data drive) and a data drive (loading and interfacing with information on the media), information pertaining to the cartridge must be available to a human operator, the mechanical accessor and the data drive. Cartridge identifying information can include, for example, the cartridge's volume serial number. Media information can include, for example, the media length or size, media capacity, and whether the cartridge is a cleaner cartridge used for cleaning the data drives.

Conventionally, the human readable information and the machine readable information have been treated separately on the cartridge. Typically, the human readable information has been printed on a stick-on label in an appropriate language while the machine readable information has taken any of several forms. Identifying information (such as the volume serial number of the cartridge) can be encoded on a label in numbers readable by a vision system or can be printed in bar code format readable by a bar code scanner. However, both of these require optical and decoding systems with relatively sensitive optical and mechanical alignment and generally do not include the media information. Media information can be provided through the use of mechanical fingers in the data drive which activate or deactivate corresponding switches when they detect holes in predetermined locations on the cartridge housing. The presence or absence of a hole in a particular location is indicative of certain media information. Because each media information code combination is represented by a different hole pattern formed when the cartridge housing is manufactured, each requires a different manufacturing mold and a separate inventory for each cartridge housing configuration. Moreover, since the human readable information is applied as a label or the like to the housing after the housing has been manufactured and the media added to it, there is increased risk that the human and machine readable information may not be consistent.

SUMMARY OF THE INVENTION

In view of the foregoing, it is an object of the present invention to provide a data cartridge or like item having a single, manufactured configuration and a set of modifiable features which contains both mechanical and human readable information.

This object and others are achieved in a first embodiment of the invention by providing a cartridge with a housing, having an indicator area on an external surface thereof, and a label covering at least the indicator area. The indicator area comprises a number Z of recesses formed in the surface (Z being at least 1); and the label comprises human readable information and Z indicator positions, each position overlaying one of said recesses in the indicator area. The indicator positions have open and closed states, the open state being indicated by a hole through the label to expose a corresponding recess. The states of the indicator positions thus represent $2^z$ bits of encoded machine readable information.

Another embodiment provides a cartridge, with a housing having a slot in an external surface thereof, and a removable insert fitted into the slot. The insert comprises a raised surface portion having human readable information and a number Z indicator positions. Again, each indicator position has open and closed states, the closed state being indicated by a raised pad. The states of the indicator positions thus comprise $2^z$ bits of encoded machine readable information.

Both embodiments can be employed with a sensor device having mechanical fingers which activate or deactivate corresponding switches when recesses are detected in the indicator locations.

The foregoing and other features and advantages of the invention will be apparent from the following more particular description of preferred embodiments of the invention, as illustrated in the accompanying drawings.

DETAILED DESCRIPTION OF THE INVENTION

Figure 1:
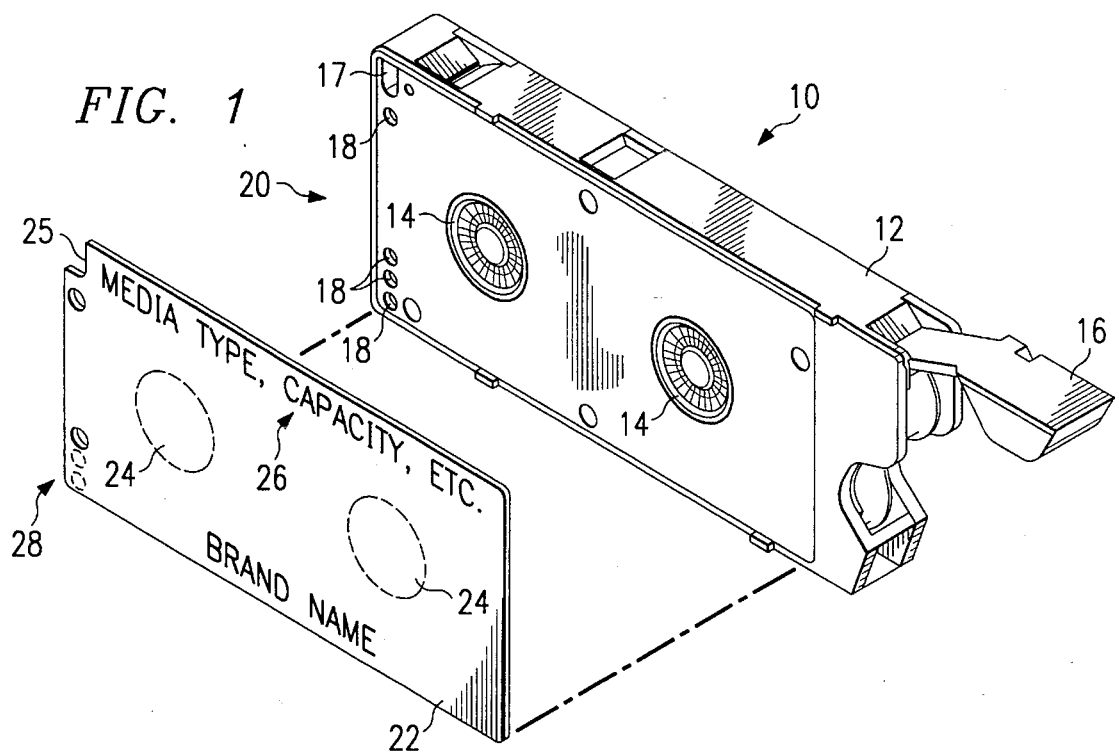
FIG. 1 illustrates a first embodiment of a data cartridge of the present invention with recesses and a label.

FIG. 1 illustrates a first embodiment of a data cartridge 10 of the present invention. While the cartridge 10 is illustrated and described herein as a double-reel magnetic tape cassette, the present invention is equally applicable to other data storage cartridges containing a recording media, including single-reel magnetic tape cartridges and optical disk cartridges, as well as other types of objects. The cartridge 10 includes a rigid housing or case 12 and reels 14 on which magnetic tape is wound within the housing 12. When the cartridge 10 is loaded into a tape drive, the tape is accessed through a hinged door 16. A two-position write protect switch 17 selectively allows or prevents data recording on the tape.

A number Z of recesses 18 (Z being at least one) are molded, drilled or otherwise formed in an indicator area 20 of a surface of the housing 12. In the cartridge 10 illustrated in FIG. 1, four recesses 18 are formed in a line along one edge of the housing 12 to conform to one configuration of drive sensors. However, other areas of the housing and other numbers of recesses can also be used to conform to other sensor configurations. The recesses 18 extend into the housing 12 sufficiently far to enable a sensor to distinguish between the presence and absence of a recess 18. The recesses 18 can also be holes through the surface of the housing 12, although such openings could undesirably allow contamination to infiltrate into the interior of the cartridge 10.

Figure 2:
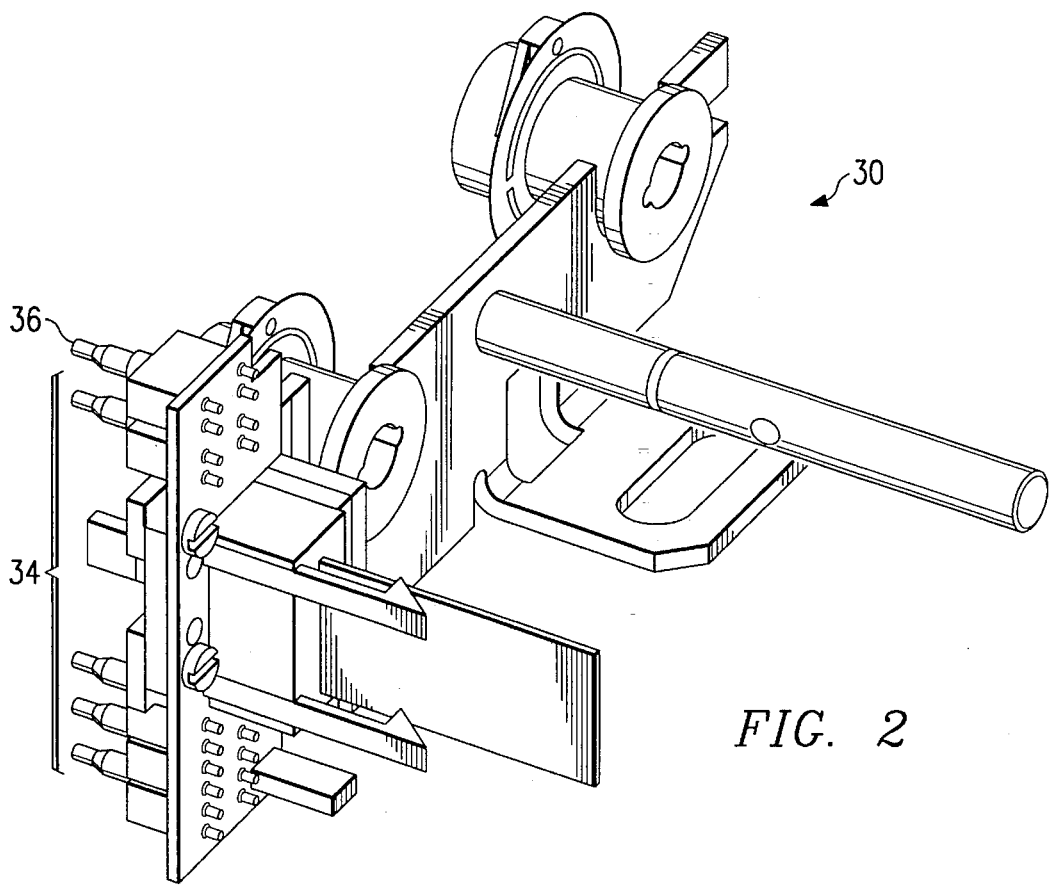
FIG. 2 illustrates a tape drive unit having mechanical sensing fingers.

FIG. 2 illustrates an exemplary loader 30. The loader 30 includes drive motors, which engage the reels 14 of the cartridge 10, and a set of Z spring-loaded sensor fingers 34 and associated switches. An additional sensor finger 36 and switch detects the status of the write protect switch 17. Not shown is the read/write head with which data is recorded to and read from tape within the housing 12.

The cartridge 10 also includes a label 22 which covers at least the indicator area 20 of the housing 12. If sufficiently large, the label 22 includes openings 24 through which the reels 14 engage drive motors within the tape drive as well as an opening or cutout 25 to expose the write protect switch 17. The label 22 has human readable information 26 written, printed, embossed or otherwise marked on the outer surface to allow a human operator to easily determine such information as the type of media, its length and its capacity. Additionally, the portion of the label 22 which overlays the indicator area 20 includes Z indicator positions 28 directly overlaying the Z recesses 18 in the housing 12. Each indicator position 28 has two possible states, open and closed, permitting the underlying recess in the indicator area 20 to be exposed or covered, respectively, as desired. Each label 22 is originally produced with no human readable information and with all of the indicator positions in the closed state. The human readable information is marked on the label 22 and indicator positions punched to form holes in appropriate locations. The label 22 is then be pasted onto the cartridge 10. The label 22 illustrated in FIG. 1 has four indicator positions 28, corresponding to the four recesses 18 in the housing 12; two of the indicator positions 28 are in the open state (represented in the FIG. by solid line) and two are in the closed state (represented by broken line).

Figure 3:
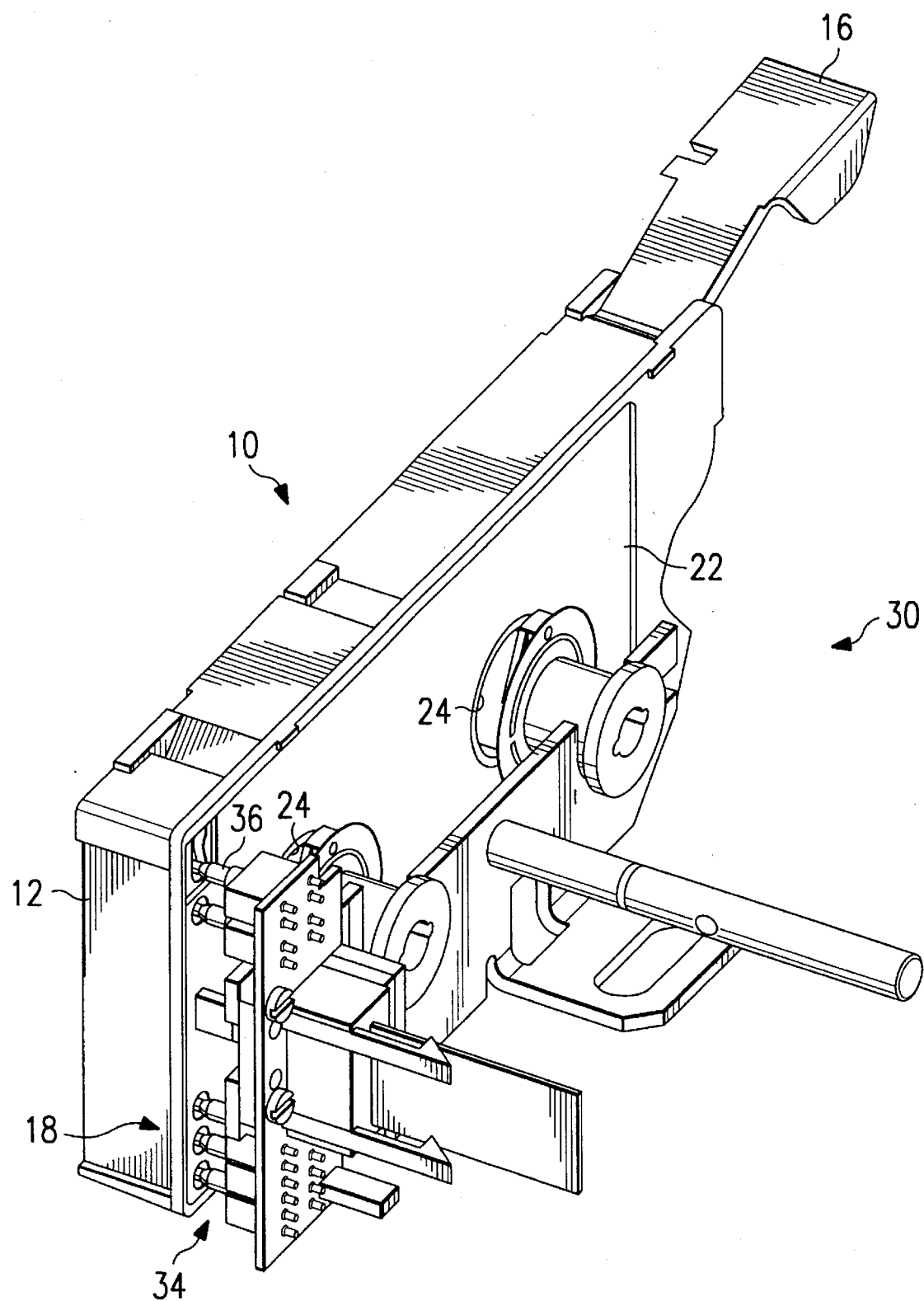
FIG. 3 illustrates the data cartridge loaded onto the drive unit and engaging the mechanical sensing fingers.
Figure 4A:
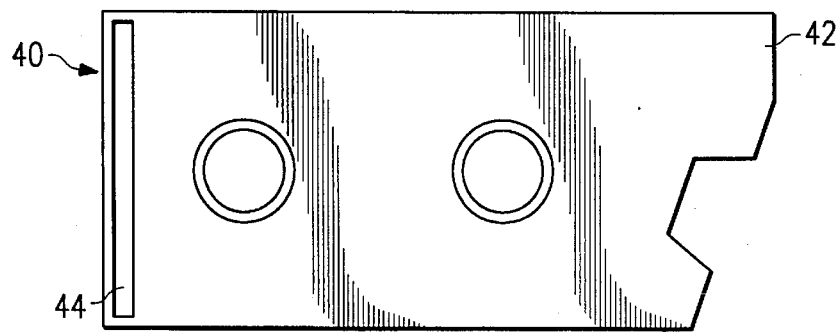
FIGS. 4A and 4B illustrate two views of a second embodiment a data cartridge of the present invention with a molded slot.
Figures 4B, 5A, 5B:
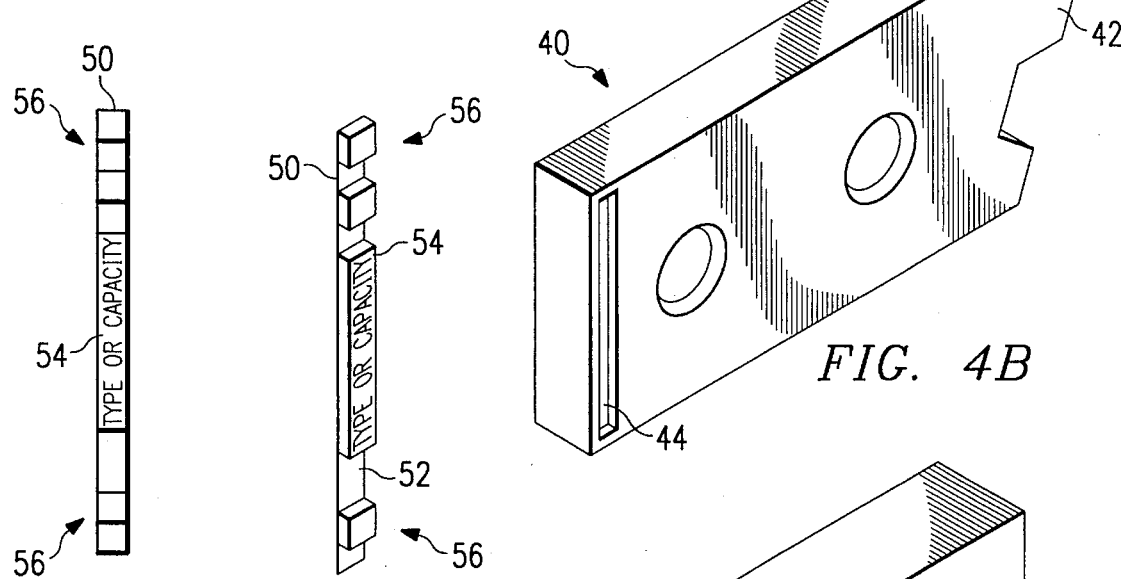
FIGS. 5A and 5B illustrate two views of an insert to be fitted within the slot of the cartridge illustrated in FIGS. 4A and 4B.

Referring to FIG. 3, when the cartridge 10 is mounted on the loader 30, the sensor fingers 34 align and engage with the indicator positions 28 on the label 22. An indicator position which is the open state permits the corresponding sensor finger to extend into the underlying recess.

Conversely, an indicator position which is the closed state prevents the corresponding sensor finger from extending into the underlying recess. Thus, switch contacts are either made or broken and connected circuitry reads and decodes their state, transmitting the information to the drive controller.

The Z recesses 18 and corresponding Z indicator positions 28 can represent Z separate pieces of information, each having one of two states (such as, the cartridge 10 is a cleaner cartridge or a standard recordable cartridge). Alternatively, the Z recesses 18 and corresponding Z indicator positions 28 can represent as $2^z$ bits of binary coded information, permitting a greater amount of encoded information to be represented.

Figure 6:
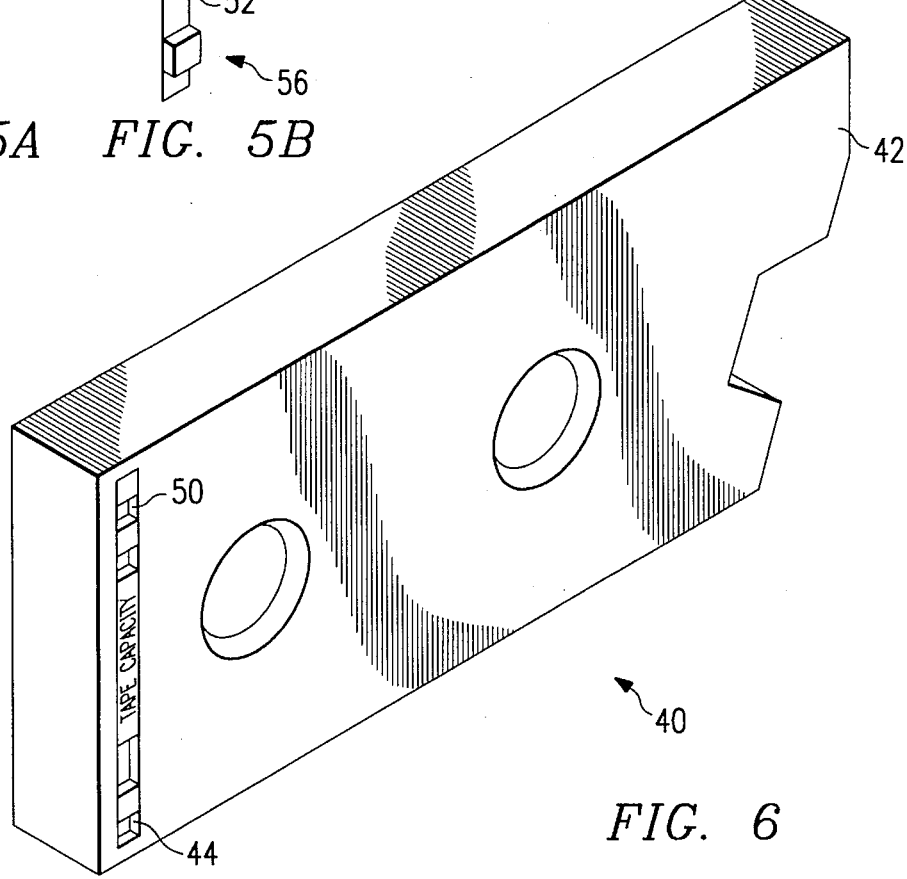
FIG. 6 illustrates a complete data cartridge with the insert of FIGS. 5A and 5B fitted into the molded slot.

Referring now to FIGS. 4A, 4B, 5A and 5B, another embodiment of a data cartridge 40 of the present invention is illustrated. The cartridge 40 has an outer housing 42 enclosing the media (again, a two-reel tape cassette is illustrated and described but this embodiment is equally applicable to other cartridges and other items as well). The housing includes a slot 44 molded, machined or otherwise formed in a surface of the housing 42. As shown, the slot 44 extends substantially across the width of the housing 42 proximate one edge; however, the present invention is not limited to this specific configuration. A removable, elongated insert 50 fits into the slot 44. The insert 50 includes a base 52, a raised surface portion 54 which contains human readable information, and a number Z indicator positions 56, again corresponding to the number and location of Z sensor fingers 34 and switches on the loader 30. Each indicator position has two states; one state is evidenced by a raised pad while the other state is evidenced by the absence of a raised pad. When the insert 50 is in the slot 44 (FIG. 6), both the human readable and machine readable information can be read in the same manner as the information contained on the cartridge 10 of the first embodiment. And, as in the case of the first embodiment, only a single cartridge housing configuration is necessary.

While the invention has been particularly shown and described with reference to preferred embodiments thereof, it will be understood by those skilled in the art that various changes in form and details may be made therein without departing from the spirit and scope of the invention. For example, if the sensing fingers 34 of the drive 30 activate/deactivate switches having more than two states (such as four), the insert 50 can include raised pads also having more than one height (such as three) in addition to the no-pad state. Thus, an even greater amount of information can be encoded.

What is claimed is:

1. An information label to be applied to an item, comprising:

human readable information on a surface of the label; and a plurality Z of indicator positions, each having an open state and a closed state, the open state of a selected indicator position indicated by a hole through said label, to permit a sensor to extend through the hole at least partially in an underlying recess in the item, the closed state preventing the sensor from extending into the recess.

2. The cartridge of claim 1, wherein said human readable information comprises printed information on said surface of said the label.

3. The label of claim 1, wherein the open and closed states of said plurality of indicator positions comprise $2^z$ bits of encoded machine readable information.

4. The label of claim 1, wherein the open and closed states of said plurality of indicator positions comprise Z items of machine readable information.

5. An information label to be inserted into a slot in a surface of an item, comprising:

a removable insert dimensioned to fit into the slot, said insert;

a raised surface portion of said removable insert having human readable information thereon; and a plurality Z of indicator positions on said removable insert, each having a closed state and an open state, the closed state of a selected indicator position indicated by a raised pad to prevent a sensor from extending past the surface of the item and the open state of the selected indicator position indicated by the absence of a raised pad to permit the sensor to extend past the surface of the item.

6. The cartridge of claim 5, wherein the closed and opened states of said plurality of indicator positions comprise $2^z$ bits of encoded machine readable information.

7. The cartridge of claim 5, wherein the open and closed states of said plurality indicator positions comprise Z items of machine readable information.

\* \* \* \* \*

UNITED STATES PATENT AND TRADEMARK OFFICE
CERTIFICATE OF CORRECTION

PATENT NO. : 5,581,073  
DATED : December 3, 1996  
INVENTOR(S) : Felde et al.

Page 1 of 1

It is certified that error appears in the above-identified patent and that said Letters Patent is hereby corrected as shown below:

<u>Column 4,</u>  
Line 36, change "The cartridge" to -- The label --

Signed and Sealed this

Thirtieth Day of April, 2002

*Attest:*

JAMES E. ROGAN  
*Director of the United States Patent and Trademark Office*

*Attesting Officer*